United States Patent [19]

Morrison

[11] Patent Number: 4,708,855

[45] Date of Patent: Nov. 24, 1987

[54] METHOD AND SYSTEM FOR EXHAUST GAS STREAM SCRUBBING

[75] Inventor: Garrett L. Morrison, Unity, Me.

[73] Assignee: Passanaquoddy Tribe, Thomaston, Me.

[21] Appl. No.: 890,991

[22] Filed: Jul. 25, 1986

Related U.S. Application Data

[63] Continuation-in-part of Ser. No. 796,075, Nov. 7, 1985, abandoned.

[51] Int. Cl.$^4$ .................. C01B 21/00; C01B 17/00; C04B 9/02; B01D 50/00
[52] U.S. Cl. ..................... 423/235; 423/208; 423/242; 422/168; 106/103
[58] Field of Search ............. 423/235, 235 D, 239, 423/239 A, 208, 242 A, 242 R, 244 A, 244 R; 422/168; 106/103

[56] References Cited

U.S. PATENT DOCUMENTS

| | | | |
|---|---|---|---|
| 3,929,968 | 12/1975 | Taub | 423/242 |
| 4,228,139 | 10/1980 | Johnson | 423/242 |
| 4,276,272 | 6/1981 | Schager et al. | 423/244 |
| 4,519,995 | 5/1985 | Schrofelbauer et al. | 423/244 |
| 4,559,211 | 12/1985 | Feldman et al. | 423/242 |

FOREIGN PATENT DOCUMENTS

| | | | |
|---|---|---|---|
| 55-27044 | 2/1980 | Japan | 423/235 |
| 111845 | 11/1918 | United Kingdom | 423/208 |
| 2152487 | 8/1985 | United Kingdom | 423/244 |

*Primary Examiner*—Gregory A. Heller

[57] ABSTRACT

Method and system for scrubbing exhaust gas stream from a wet process cement plant wherein a supply of alkaline water and a supply of compressed air are delivered to spray nozzles which are located within the existing exhaust stream ducting. The alkali water is sprayed as a finely divided mist into the duct where it rapidly reacts with the oxides of sulfur and nitrogen present in the exhaust gas. The water, being in the form of very small droplets, and having small volume and large surface area to water volume ratio, rapidly evaporates. The water, therefore, does not cause a problem of wetting and clogging of the ducting and the oxides of sulfur and nitrogen are converted to dry solid particulates which are removed by normal dust collection systems downstream of the scrubber.

4 Claims, 2 Drawing Figures

METHOD AND SYSTEM FOR EXHAUST GAS STREAM SCRUBBING

This application is a continuation-in-part of application Ser. No. 796,075, filed Nov. 7, 1985, entitled EXHAUST GAS STREAM SCRUBBING, now abandoned.

BACKGROUND OF THE INVENTION

This invention relates to scrubbing of exhaust gas in exhaust streams from wet process cement kilns.

The reaction between water and the oxides of sulfur and nitrogen produced during combustion have been well established in standard chemistry texts. Similarly, the use of alkali materials or alkali solutions for scrubbing of exhaust gas has been known for years. In general, the reactions between water, air, and the oxides of sulfur and nitrogen produce acids including sulfurous, sulfuric, nitrous, and nitric. Use of an alkali material or an alkali solution can result in neutralization of the acids to form a salt plus water.

Problems with scrubber systems include the high cost of the system, the cost of alkali material, and the energy requirement to provide sufficient contact between the alkali materials or alkali solutions and the exhaust gas. An additional problem with spraying water or limestone slurries into the exhaust stream of wet process cement kilns is the associate cooling of the exhaust which can result in condensation of the high percentage of water in the exhaust.

It is the object of this invention to provide a scrubbing system and method relatively low in cost, having a low energy requirement and low material cost, which causes minimal cooling of the exhaust, and which will provide significant removal of exhaust gas pollutants. The invention is specifically intended to provide removal of sulfur dioxide ($SO_2$) and nitrogen oxides from exhaust gas. Removal of sulfur trioxide ($SO_3$) is efficiently accomplished by the raw feed in a cement kiln as a natural function of the cement making process.

The invention is described in relation to a coal fired wet process producing facility. Because of the very high water content of the exhaust gas stream from a wet process cement kiln, and, therefore, the limits imposed on the ability to add water to the exhaust stream, such a facility presents probably the worst case in which to provide significant scrubbing. The process must scrub efficiently while keeping cooling of the exhaust to an absolute minimum. The process, however, is not limited to coal fired plants and may be applied to cement kilns fired by coal, oil, or other fuels. The system could be used to cleanse exhaust streams other than those from cement plants, such as lime kilns or other systems having oxides of sulfur and nitrogen as pollutants in the exhaust stream and having very high water content exhaust. The principal requirement is that scrubbing take place prior to the exhaust gas reaching the dust collection facilities while not cooling the exhaust to the point that condensation can occur in or before the dust collection facilities.

To accomplish the purpose an aqueous solution of very soluble alkaline material and a supply of compressed air are delivered to spray nozzles which are located within the existing exhaust stream ducting. The alkali water, principally a solution of potassium hydroxide, is sprayed as a finely divided mist into the duct where it rapidly reacts with the oxides of sulfur and nitrogen present in the exhaust gas. The total amount of water, because of the high solubility of the alkali, is minimized. The unreacted water being in the form of very small droplets, and having small volume and large surface area to water volume ratio, rapidly evaporates while causing minimal cooling of the exhaust. The water, therefore, does not condense to a liquid and does not cause a problem of wetting and clogging of the ducting. The oxides of sulfur and nitrogen are converted to dry solid particulates which are removed by normal dust collection systems downstream of the scrubber.

BRIEF SUMMARY OF THE INVENTION

With the foregoing in mind, in accordance with the invention there is provided the method of scrubbing an exhaust gas stream from a wet process cement kiln which comprises introducing into the stream as it exits from the kiln and enters a downstream dust collector a finely divided mist comprised of an aqueous solution of highly soluble alkaline material in sufficient quantity in relation to the concentration of oxides of sulfur and nitrogen in the stream instantly to neutralize the acids formed by the reaction of the water content of the mist therewith to produce dry solid particulates capable of collection with the dust in the collector. Preferably, the aqueous solution is derived from leaching of alkali material, principally potassium hydroxide, from waste dust produced by the cement making process and the solution has a pH in the range of 12.0 to 12.3. The system does not introduce dry solid materials such as limestone for reaction with sulfur trioxide. It also does not introduce water for cooling.

The invention includes the system for scrubbing an exhaust gas stream from a wet process cement kiln before it enters a dust collector comprising means for introducing a finely divided mist of an aqueous solution of highly soluble alkaline material into the stream immediately upstream of the dust collector in sufficient quantity in relation to the concentration of oxides of sulfur and nitrogen in the stream instantly to neutralize the acids formed by the reaction of the water content of the mist therewith to produce dry solid particulates capable of collection with the dust in the collector.

In preferred embodiments, the solution is the product derived from leaching alkali material, principally potassium hydroxide, from waste dust produced in the cement making process; there are provided a reservoir for the solution and means for pumping the solution from the reservoir to the spray nozzles; and the spray nozzles for creating the mist are arranged in an array in the stream and means are included for selectively activating one or more of the same.

DETAILED DESCRIPTION OF PREFERRED EMBODIMENT

Figure 1:
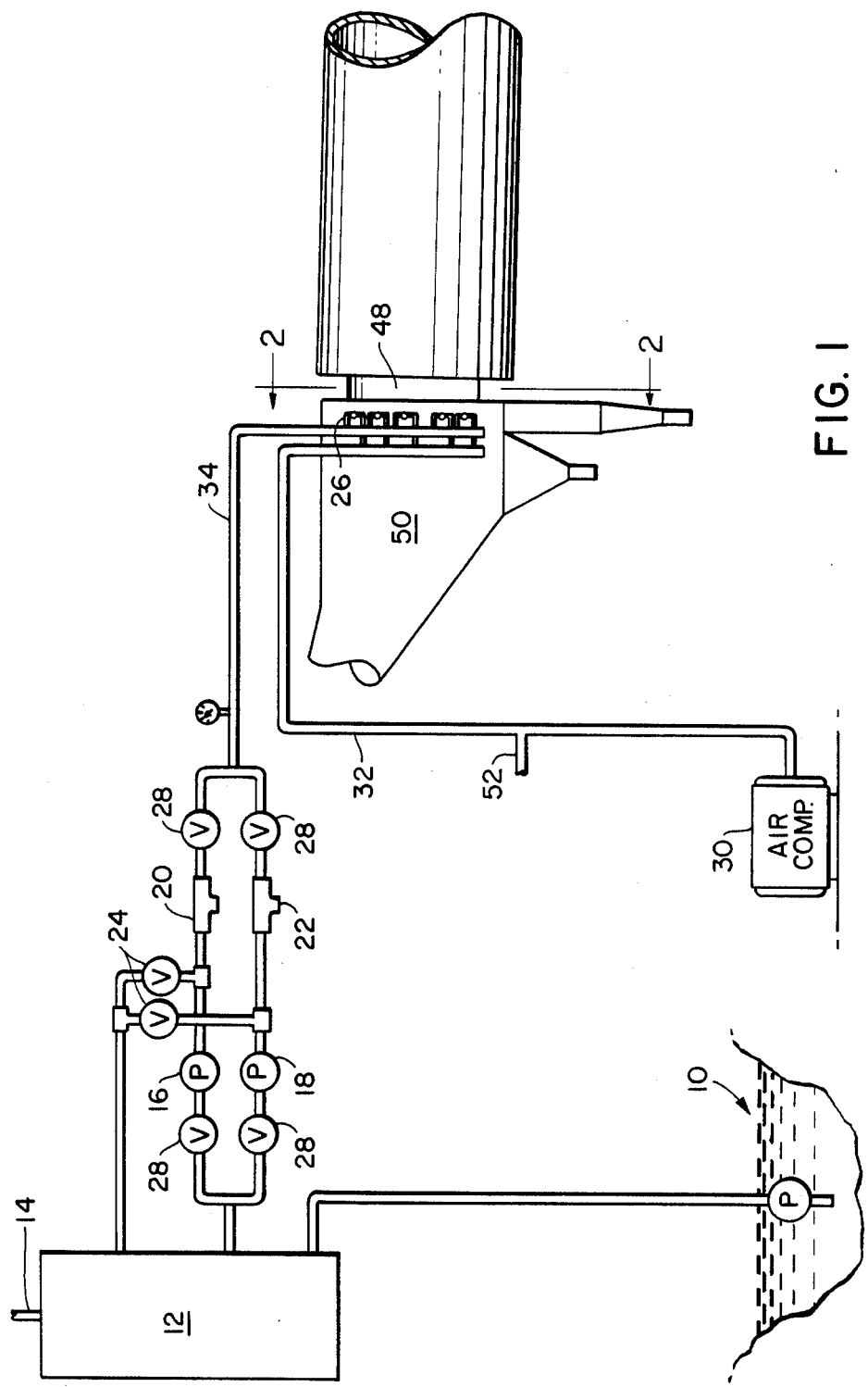
FIG. 1 is a schematic side elevation of a portion of a coal fired wet process cement plant illustrating the air and liquid supply system feeding the spray nozzles located in the exhaust stream at the kiln exit.

FIG. 1 shows the alkali solution reservoir 10, the compressed air supply 30, and the location of the array of spray nozzles 26 in the ducting 50 immediately after the end of the kiln 48.

The alkali water supply 10 is a solution having a pH of 12.0 to 12.3 and is derived from leaching of alkali material from waste dust derived from the cement making process. Waste cement kiln dust contains oxides of potassium, sodium and calcium which on reaction with water produce potassium, sodium and calcium hydroxides. The hydroxides are leached from the waste dust and stored for later use as alkali scrubbing fluid. The alkali solution may be derived from other sources and may be used at other pH values providing that the concentration of alkali is great enough to provide adequate removal of $SO_2$ and $NO_x$ while minimizing cooling of the exhaust stream and attendant condensation of water from the exhaust stream.

The alkali solution is pumped to a storage tank 12. The storage tank 12 may also be supplied from a non-alkaline back-up source 14 for temporary or emergency use. Solution is pumped from the tank 12 by either of two high pressure pumps 16, 18, (one providing a back-up for the other) through a filter 20 or 22 to the spray nozzles 26. Valves 24 control the relative proportion of flow to the nozzles 26 or recirculation to the tank 12. Valves 28 isolate one or the other of pumps 16,18 and filter 20,22 systems so that only one flow train is in use at a time and a back-up system is provided.

The air compressor 30 provides compressed air to the nozzles 26 for atomization of the alkali fluid 10. An auxiliary compressed air supply 52 is also available to allow servicing of the compressor 30 while keeping the scrubber functioning. The compressed air supply in this case should provide up to 105 standard cubic feet of air per minute at pressures up to 125 pounds per square inch. The air pressure required is variable and depends on the type of nozzle 26 in use, the desired droplet size, and the number of nozzles 26 in use. In other applications the required air pressure and/or volume may be larger or smaller.

Figure 2:
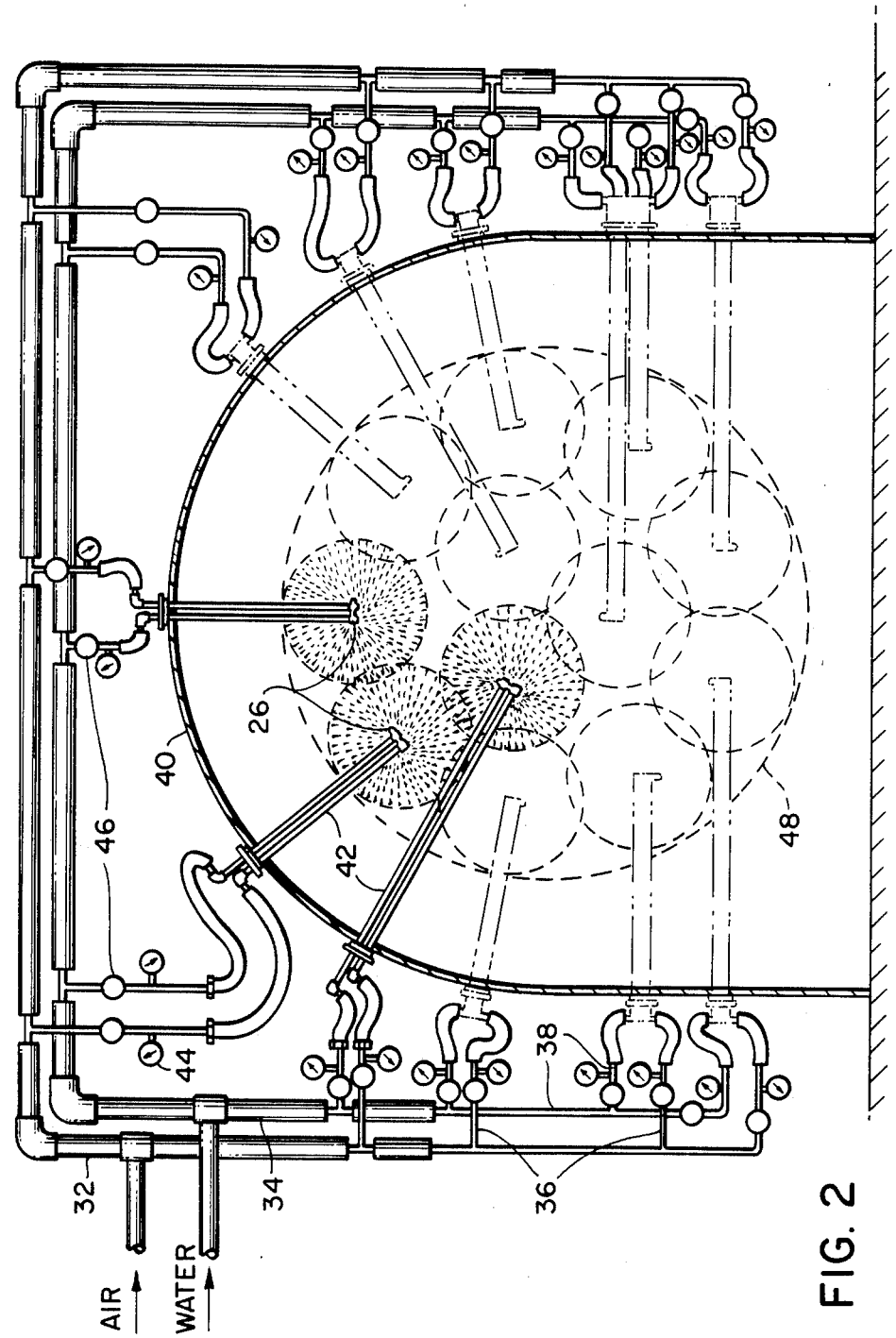
FIG. 2 is a cross-section taken on line 2—2 of FIG. 1.

Referring now to FIG. 2 there is shown the exit end of the kiln 48, the twelve nozzles 26 used in this application, the air delivery line 32, the high pressure water line 34, and the distribution piping 36,38 for the air and water systems respectively. Also shown is the exhaust gas ducting 40 to which the nozzle supply pipes 42 are attached. Each air and water supply line to the nozzles is fitted with a pressure gauge 44 to indicate fluid pressure and with valves 46 for adjusting the air and water pressures.

The spray nozzles used in this application are commercially available from the Delavan Corporation, West Des Moines, Iowa. The specific nozzle is "Swirl-air" #P/N 32163-2. This nozzle utilizes air to aid in atomization of the liquid. Other nozzle types, including those that do not use air, may be used in accordance with the liquid volume and droplet size required for a specific application.

OPERATION

The basic working principle of this invention is to supply suficiently small liquid droplets directly to the exhaust gas stream within the exhaust gas duct where (a) droplet size is small enough to be rapidly evaporated to avoid wetting entrained dust or downstream ductwork, (b) total liquid surface area is sufficiently high to allow rapid reaction between the scrubbing fluid and the exhaust gas, (c) the alkali concentration is high to minimize water injection, and (d) the solid particulates produced by evaporation of the scrubbing fluid are sufficiently dry to be collected or removed from the exhaust stream by standard dust removal facilities.

In the preferred embodiments shown, the nozzles 26 are located at the exit or feed end 48 of the kiln, upstream from the dust collection system. The liquid droplet size is in the range of 35 to 100 microns. In other applications the droplet size could be increased or decreased depending on the scrubbing required and on the nature, water content, and temperature of the exhaust gas. Persons skilled in the art, with knowledge of the conditions, are capable of making the necessary adjustments to adapt the system to new applications.

The spray nozzles can be selectively activated as desired or as is dictated by the exhaust gas handling system. In the present case, three to five nozzles are used at one time because of the strongly temperature stratified nature of the exhaust gas and its high water content. If exhaust gas volume or temperature increases or decreases more or fewer nozzles can be put in service.

The scrubbing efficiency of the invention is variable depending on the exhaust gas temperature, volume and water content, and on the initial concentration of the chemical species to be removed.

For constant temperature and exhaust gas volume, the limit on the maximum scrubbing is the stoichiometric relationship between the weight of scrubbing fluid and the exhaust gas constituents to be removed.

In coal fired wet process cement plants the principal oxide to be removed is sulfur dioxide ($SO_2$). A six-month test was run in one cement plant. The amount of $SO_2$ in the exhaust stream is variable and ranges from about 30 pounds per hour to 1000 pounds per hour for short periods. The average observed during the unscrubbed portion of a 6-month test period was 206 pounds per hour. The average observed during the scrubbed portion of the same 6-month test period was 85 pounds per hour. The average $SO_2$ removal efficiency was found to be 58.74 percent.

The foregoing disclosure is by way of illustration. It is intended that the scope of the invention be limited only by the proper interpretation of the following claims.

I claim:

1. The method of scrubbing an exhaust gas stream containing sulfur oxides and nitrogen oxides from a wet process cement kiln which comprises introducing into the stream as it exits from the kiln and enters a downstream dust collector a finely divided mist comprised of an aqueous solution of highly soluble alkaline material in only sufficient quantity in relation to the concentration of oxides of sulfur and nitrogen in the stream instantly to neutralize the acids formed by the reaction of the water content of the mist therewith while completely evaporating said solution to produce dry solid particulate salts capable of collection with the dust in said collector, and while causing minimal cooling of the exhaust stream, said aqueous solution being derived from leaching of principally potassium containing alkali material from waste dust produced by cement making.

2. The method of claim 1 where said solution has a pH in the range of about 12.0 to 12.3.

3. A system for scrubbing an exhaust gas stream containing sulfur oxides and nitrogen oxides from a wet process cement kiln of a cement plant before it enters a dust collector comprising means for leaching a principally potassium containing aqueous solution from waste dust produced in cement making,
said leaching means including a reservoir for storing said solution,
an array of nozzles located immediately upstream of said dust collector beyond the exit end of said kiln,
means for pumping said solution from said reservoir to said nozzles for discharge therefrom into said stream in the form of a finely divided mist in only sufficient quantity in relation to the concentration of oxides of sulfur and nitrogen in the stream instantly to neutralize the acids formed by the reaction of the water content of the mist therewith while completely evaporating said solution to produce dry solid particulate salts for collection with the dust in sid collector, while causing minimal cooling of the exhaust stream, said solution being the product derived from leaching principally potassium containing alkali material from waste dust produced in cement making.

4. The system of claim 3 including means for selectively activating one or more of said nozzles.

* * * * *

UNITED STATES PATENT AND TRADEMARK OFFICE
CERTIFICATE OF CORRECTION

PATENT NO. : 4,708,855
DATED : November 24, 1987
INVENTOR(S) : Garrett L. Morrison It is certified that error appears in the above-identified patent and that said Letters Patent are hereby corrected as shown below:

On the title page:

Assignee: "Passanaquoddy" should be -- Passamaquoddy --

In the References Cited "Schager" should be -- Schlager --

Col. 1 line 43, after "process" insert -- cement --

Col. 3, line 60, "suficiently" should be -- sufficiently --

Signed and Sealed this

Fifth Day of April, 1988

Attest:

DONALD J. QUIGG

Attesting Officer

Commissioner of Patents and Trademarks